United States Patent [19]
Tashiro et al.

[11] 3,811,079
[45] May 14, 1974

[54] DC MOTOR CONTROL SYSTEM

[75] Inventors: Korefumi Tashiro, Hitachi; Yoshimitsu Onoda; Seiya Shima; Yoshio Sakai, all of Katsuta; Toshiro Narita, Hitachi, all of Japan

[73] Assignee: Hitachi, Ltd., Tokyo, Japan

[22] Filed: Apr. 25, 1973

[21] Appl. No.: 354,459

[52] U.S. Cl. ............................ 318/338, 318/356
[51] Int. Cl. .................................. H02p 5/16
[58] Field of Search ............... 318/338, 350, 356

[56] References Cited
UNITED STATES PATENTS
| | | | |
|---|---|---|---|
| 3,026,464 | 3/1962 | Greening | 318/338 |
| 3,401,325 | 9/1968 | Stringer | 318/350 |
| 3,735,220 | 5/1973 | Renner | 318/338 |

FOREIGN PATENTS OR APPLICATIONS
| | | | |
|---|---|---|---|
| 1,918,584 | 10/1969 | Germany | 318/338 |

*Primary Examiner*—Bernard A. Gilheany
*Assistant Examiner*—Thomas Langer
*Attorney, Agent, or Firm*—Craig & Antonelli

[57] ABSTRACT

A system for controlling the speed of a DC motor by means of a field control in which a rectifier in the form of a thyristor is connected to the armature of the motor for supplying a current in only one direction and is controlled to constitute a constant current control means. An integrator having a saturation characterisitc is provided for integrating the difference between a reference speed and an actually detected speed of the motor. The output of the integrator is added to the reference speed and the result of addition is compared with the actually detected speed so as to apply a field current instruction signal to a field current control means provided with a current negative feedback means.

3 Claims, 3 Drawing Figures

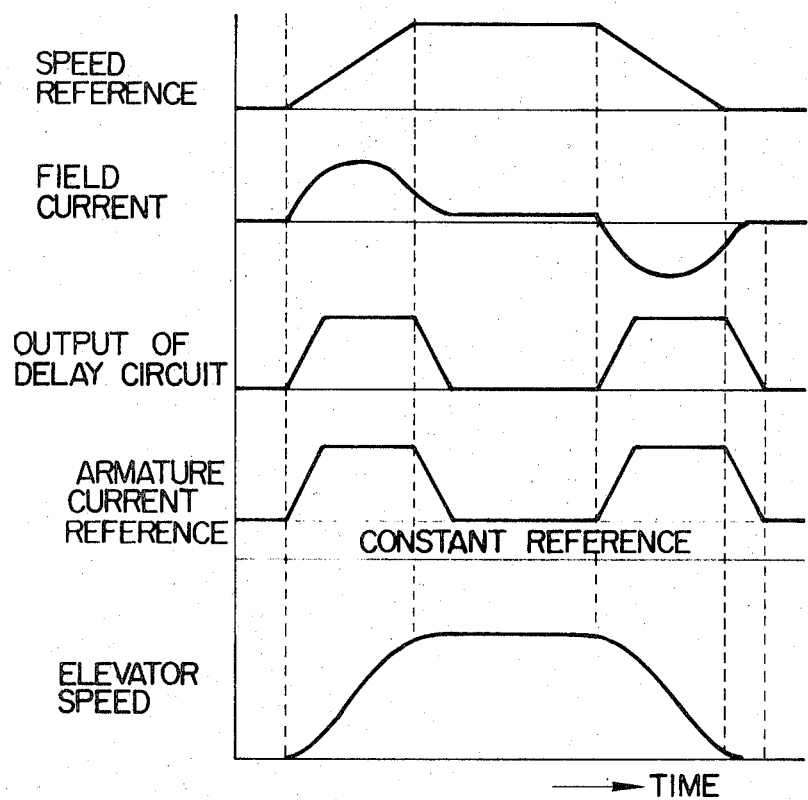

DC MOTOR CONTROL SYSTEM

This invention relates to DC motor control systems and more particularly to improvements in the control system for DC motors which drive elevator cars.

DC motors for driving elevator cars have almost invariably been controlled by the Ward Leonard system. Recently, however, a static Leonard system employing a rectifying means including a thyristor (hereinafter referred to as a thyristor type static converter) has been proposed to meet the current tendency toward employment of static circuit elements. This static Leonard system comprises two sets of thyristor type static converters for operation in the normal and reverse directions. It is commonly known that the static Leonard system is operated according to two methods, that is, a non-circulating current method and a circulating current method. In the case of the former method, reversion of the direction of the load torque cannot be smoothly followed by corresponding reversal of the armature current and gives rise to a shock. Thus, employment of this method for the control of drive means for elevator cars and the like is undesirable in that the shock gives an uncomfortable sense of ride to the passengers. On the other hand, the latter method is suitable for the control of a load such as an elevator car since the reversal of armature current can be smoothly done.

However, the static Leonard system operated according to the circulating current method requires complex control means due to the fact that two sets of converters must be controlled while maintaining always a predetermined relationship therebetween. In addition to the above disadvantage, means such as a power transformer and a DC reactor are additionally required resulting in a bulky and costly equipment. Thus, the static Leonard system cannot be said to be advantageous over the Ward Leonard system in the present status.

Such defects of the static Leonard system have long been recognized and various proposals have been made in an effort to obviate these defects. A field current switch-over system is typical of such proposals. According to this field current switch-over system, only one set of thyristor type static converter is disposed on the armature side for causing flow of armature current in one direction only and field current is switched over between the normal and reverse directions. This field current switch-over system is also operated according to two methods. According to one of these methods, change-over between the normal torque and the reverse torque is carried out by switching over the direction of field current and the speed in both the normal and reverse torque conditions is controlled by the thyristor type static converter disposed on the armature side. According to the other method, the thyristor type static converters disposed on the field side are utilized for controlling the speed over the entire region of normal and reverse torque, that is, over the four quadrants of the speed-torque characteristics or coordinates.

The former method is not suitable for application to a controlled object of the kind in which the load torque varies irregularly between a positive value and a negative value. This is because a dead time required for the switchover of the direction of field current appears inevitably during the operation, and in such a period of time, it is impossible to control the object. Thus, this method is essentially unfit for application to an object such as an elevator car.

On the other hand, the latter method is basically capable of continuous control over the entire region including the four quadrants of the speed-torque coordinates. Actually, however, various problems as described below are involved in the control of field current, and the latter method has not yet been put into practical use.

1. The speed tends to oscillate in response to the application of a stepped instruction input. Such phenomenon does not appear in the case in which the instruction signal varies moderately. However, the method above described cannot be adopted unless a stable control system is developed according to which undesirable oscillation of the speed would not occur even in response to the application of a stepped instruction signal to an elevator which is designed to operate with a moderately varying instruction signal.
2. The response is slow. The current in the field coil responds very slowly to the instruction signal and the control performance is remarkably poor compared with other control systems.
3. An undesirable offset is produced. Errors tend to occur due to the reason described in 2 and the desired speed control cannot be attained.

It is an object of the present invention to provide a novel and improved static DC motor control system which can be satisfactorily employed for controlling a drive means for a moving body such as an elevator car for which a high stability is requested.

Another object of the present invention is to provide a DC motor control system in which the number of parts is less than that required in the prior art static Leonard system, and therefore, which is highly economical and reliable.

Still another object of the present invention is to provide a static DC motor control system which is capable of continuous control over all of the four quadrants on the speed-torque coordinates.

Yet another object of the present invention is to provide an improved static DC motor control system which does not produce oscillation of the speed in response to a stepped instruction signal, which shows a quick response, and which is free from any offset errors.

A further object of the present invention is to provide a static DC motor control system which is capable of minimizing an undesirable temperature rise of a DC motor.

In accordance with one aspect of the present invention, there is provided a DC motor control system comprising a DC motor, a first power converter for supplying current in only one direction to the armature of said DC motor, means including said first power converter for controlling the armature current, a second power converter for supplying current to the field winding of said DC motor, means for applying a reference speed instruction signal, means for integrating the difference between the reference speed instruction signal and the actually detected speed responsive signal with a saturation characteristic, means for adding the output of said integrating means to the reference speed instruction signal, means for controlling said second power converter depending on the difference between the output of said adding means and the actually detected speed responsive signal, and means for detecting the field current for the negative feedback of the detected field current responsive signal to said control means.

In accordance with another aspect of the present invention, there is provided a DC motor control system of the above character, further comprising means for increasing the armature current during the period of time in which the reference speed is varying.

Other objects, features and advantages of the present invention will be apparent from the following detailed description of a preferred embodiment thereof taken in conjunction with the accompanying drawing, in which:

FIG. 3 shows variations relative to time of the reference speed, field current, delay circuit output, reference armature current and elevator speed in the embodiment shown in FIG. 1.

Torque T produced by a DC motor is given by $$T = \phi \, Ia \quad (1)$$

where $Ia$ is the armature current and $\phi$ is the quantity of unit rotating magnetic flux. Therefore, the torque T is proportional to the quantity $\phi$ of unit rotating magnetic flux when the armature current $Ia$ is constant. Thus, all of the four quadrants on the speed-torque coordinates, hence the motoring, braking, normal rotation and reverse rotation of the DC motor can be continuously controlled when the armature current $Ia$ is controlled to be maintained constant and the field current is continuously controlled over the positive and negative regions.

Figure 1:
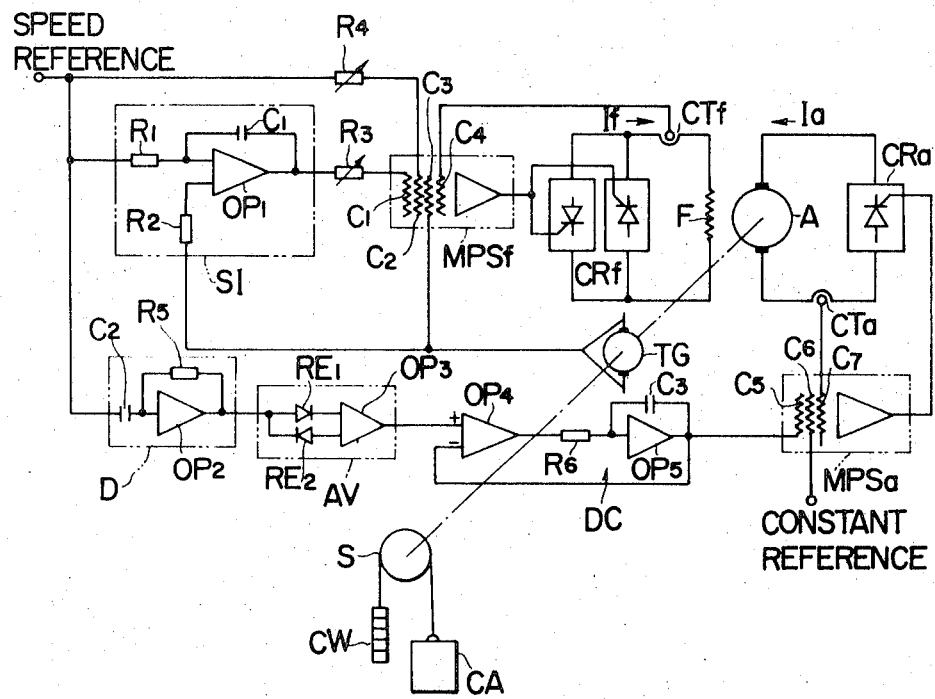
FIG. 1 is an electrical circuit diagram of a DC motor control system embodying the present invention.

Referring to FIG. 1 showing a control circuit for a DC motor for driving an elevator car CA according to the present invention, a thyristor type static converter or power converter CRa is connected across the armature A of the DC motor for supplying an armature current $Ia$ thereto. An armature current detector CTa is connected to a control winding of a magnetic phase shifter MPSa for the negative feedback of its output to the latter, and thus, the power converter CRa constitutes an armature current control means together with the magnetic phase shifter MPSa.

On the other hand, two sets of normal and reverse thyristor type static converters or power converters $CR_f$ are connected across the field coil F of the motor for supplying a field current $I_f$. These two sets of power converters $CR_f$ are controlled by a magnetic phase shifter $MPS_f$ to which the following inputs are applied. A tachometer generator TG is operatively connected to the motor for detecting the actual speed of the motor. The output of tachometer generator TG is applied to an integrator SI together with a signal representative of a reference speed. This integrator SI is composed of an operational amplifier OP1, an integrating capacitor C1 and input resistors R1 and R2 and has a saturation characteristic. Therefore, the difference between the input representative of the reference speed and the input representative of the actual speed is integrated by the integrator SI until finally a predetermined value is reached. The output of the integrator SI is applied through an adjusting resistor R3 to a first control winding C1 of the magnetic phase shifter $MPS_f$. The signal representative of the reference speed is also applied through an adjusting resistor R4 to a second control winding C2 of the magnetic phase shifter $MPS_f$. The output of the tachometer generator TG is applied to a third control winding C3 of the magnetic phase shifter $MPS_f$ in addition to the integrator SI. Further, the output of a field current detector $CT_f$ which detects the field current $I_f$ is negatively fed back to a fourth control winding C4 of the magnetic phase shifter $MPS_f$.

Thus, the difference between the signal representative of reference speed and the signal representative of the actual speed is integrated by the integrator SI having the saturation characteristic, and after adding the output of the integrator SI to the signal representative of the reference speed, the result of addition is compared with the signal representative of the actual speed for obtaining a field current instruction signal. These means are also associated with a field current negative feedback means. The integrator SI having the saturation characteristic is especially for eliminating undesirable offset errors and the field current negative feedback means is especially for improving the response speed. The armature current $Ia$ of the motor may be maintained constant or it may be increased only when the elevator car CA is accelerated and decelerated that is, only during the period of time in which the reference speed is varying. When the armature current $Ia$ is controlled to be maintained constant, it should be selected to have such a current value with which sufficient torque can be produced during acceleration and deceleration. For this purpose, an armature current having a value which is almost three times the rated value must be continuously supplied to a conventional motor. However, it was accertained that such current value could be sufficiently provided by suitably improving the structure of the motor. When a conventional motor is employed without any modification in the structure, continuous supply of an armature current whose value is almost three times the rated value would lead to burn-out trouble of the motor. In such a case, the manner of control may be such that the level of the constant armature current may be raised only during acceleration and deceleration.

A differentiator D, which is composed of a differentiating capacitor C2, an operational amplifier OP2 and a resistor R5, delivers an output corresponding to the rate of variation of the reference speed when the reference speed is varying. The output of the differentiator D is applied to an absolute value circuit AV. This absolute value circuit AV is composed of two diodes RE1 and RE2 and an operational amplifier OP3 and delivers an output of a predetermined direction in spite of variations of the reference speed in the positive or negative direction. A delay circuit DC, which is composed of two operational amplifiers OP4 and OP5, a resistor R6 and a capacitor C3, is provided so that the steep slope of the rising and falling edges of the stepped input applied from the absolute value circuit AV can be changed into a gentle slope. The output of this delay circuit DC is applied to a first control winding C5 of the magnetic phase shifter MPSa. A constant reference current instruction signal is applied to a second control winding C6 of the magnetic phase shifter MPSa. Further, the output of the armature current detector CTa is negatively fed back to a third control winding C7 of the magnetic phase shifter MPSa as described previously. The motor is connected to a sheave S for driving the elevator car CA and a counter weight CW in the vertical direction.

As described previously, a stepped speed instruction signal is not generally applied to an elevator. However, the control system must be such that it can operate stably without any oscillation in the speed even when a stepped speed instruction signal is applied to the elevator.

Figure 2:
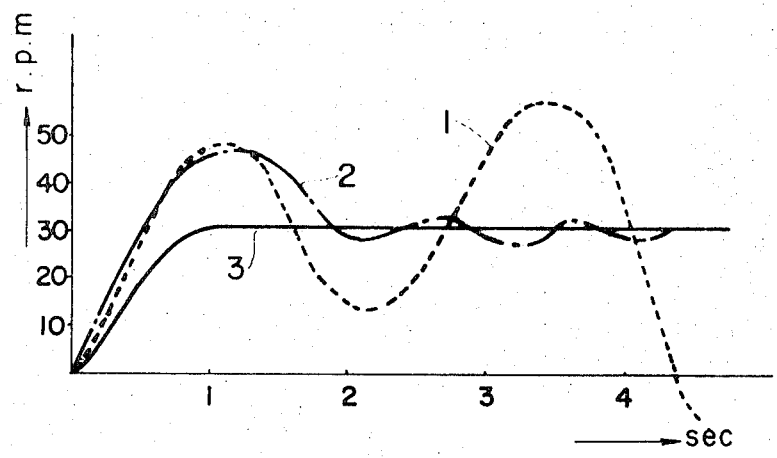
FIG. 2 is a graph showing variations of speed relative to time of DC motors in the present invention and prior art systems in response to a stepped instruction input.

FIG. 2 shows variations of the speed relative to time of elevator cars controlled by the control system of the present invention and prior art systems in response to the application of a stepped speed instruction signal instructing the speed of 30 r.p.m. The dotted curve 1 in FIG. 2 represents the case in which the speed instruction signal is not applied to the second control winding C2 of the magnetic phase shifter MPS$_f$. The dotted curve 2 represents the case in which the output of the integrator SI of the saturation type is not applied to the first control winding C1 of the magnetic phase shifter MPS$_f$. It will be apparent from the curves 1 and 2 that the speed of the motor oscillates in both these cases resulting in the difficulty of controlling the field current. The solid curve 3 in FIG. 2 represents the time-speed characteristic obtained with the improved control system according to the present invention. It is apparent from the curve 3 that very stable response can be obtained according to the present invention.

FIG. 3 is a time chart showing the actual test results obtained with an elevator employing the control system according to the present invention. In the test, a DC motor of conventional construction was employed and the armature current was increased to about three times the constant reference value only for the period of the change in the speed instruction signal, that is, only during acceleration and deceleration. It will be apparent from FIG. 3 that the elevator can be operated with an ideal speed characteristic.

The control system according to the present invention is advantageous over the prior art Ward Leonard system in that the cost is about the half of the latter when a three-phase thyristor bridge is employed as an armature current source. Further, temperature variations in the resistance of the armature circuit exerts a very bad influence on the control of a DC motor of conventional construction. It is an additional excellent advantage of the present invention that the control performance is not dependent upon the temperature variations due to the fact that such resistance is outside of the control system.

What we claim is:

1. A DC motor control system comprising a DC motor, a first power converter means for supplying current in only one direction to the armature of said DC motor, means including said first power converter for controlling the armature current, a second power converter means for supplying current to the field winding of said DC motor, means for generating and applying applying a reference speed instruction signal, detecting means for generating a speed responsive signal, means for integrating the difference between the reference speed instruction signal and the actually detected speed responsive signal with a saturation characteristic, means for adding the output of said integrating means to the reference speed instruction signal, summing means for controlling said second power converter depending on the difference between the output of said adding means and the actually detected speed responsive signal, and means for detecting the field current to apply it as negative feedback to said summing means.

2. A DC motor control system as claimed in claim 1, further comprising means for increasing the armature current during the period of time in which the reference speed is varying.

3. A DC motor control system as claimed in claim 2, further comprising means for applying a signal representative of a constant current value, means for differentiating the reference speed instruction signal, means for detecting the absolute value of the differentiated reference speed instruction signal, means for combining the output of said absolute value detecting means with said signal representative of the constant current value, and means for applying the output of said combining means to said armature current control means as a current instruction signal.

* * * * *